(12) United States Patent
Kurdziel (10) Patent No.: US 7,251,326 B2
(45) Date of Patent: Jul. 31, 2007

(54) METHOD AND APPARATUS FOR DATA ENCRYPTION

(75) Inventor: Michael Thomas Kurdziel, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 976 days.

(21) Appl. No.: 09/893,461

(22) Filed: Jun. 29, 2001

(65) Prior Publication Data

US 2003/0002663 A1 Jan. 2, 2003

(51) Int. Cl.
  *H04K 1/04* (2006.01)
  *H04K 1/06* (2006.01)
  *H04L 9/00* (2006.01)

(52) U.S. Cl. ......................... 380/37; 380/277

(58) Field of Classification Search .................. 380/30, 380/27, 44, 28, 37, 277
See application file for complete search history.

(56) References Cited

U.S. PATENT DOCUMENTS

| 5,201,000 A | * | 4/1993 | Matyas et al. ................ 380/30 |
| 5,214,703 A | | 5/1993 | Massey et al. |
| 5,835,603 A | * | 11/1998 | Coutts et al. .................. 705/70 |
| 6,061,449 A | * | 5/2000 | Candelore et al. ............ 380/28 |
| 6,108,421 A | | 8/2000 | Kurdziel et al. |
| 6,424,713 B1 | | 7/2002 | Sprunk |
| 2002/0018562 A1 | * | 2/2002 | Lim ............................ 380/37 |

* cited by examiner

*Primary Examiner*—Jacques Louis-Jacques
*Assistant Examiner*—Christopher J. Brown
(74) *Attorney, Agent, or Firm*—Duane Morris LLP (57) ABSTRACT

A method and apparatus for use in encrypting and decrypting digital communications converting an initial block to final block based on freely selectable control information and secret key information having double the length of prior art keys and maintaining compatibility with the prior art encryption system.

1 Claim, 6 Drawing Sheets

METHOD AND APPARATUS FOR DATA ENCRYPTION

BACKGROUND OF THE INVENTION

The invention is directed to encrypting and decrypting blocks of digital data, and more specifically, to a cipher method and device for the block-by-block conversion of a first digital block into a second digital block using at least one freely selectable control block, using an improved block cipher with double the key length and significantly increased cryptographic strength while still providing a mode for inter-operability with prior art systems.

The rapidly growing use of digital communication systems in commerce has spurred the need for cryptographic systems which are secure against popular "cryptoanalysis" or cracking techniques at least for a sufficient length of time. Prior art systems such as Massey, et al. U.S. Pat. No. 5,214,703 use a block cipher device which is suitable both for the encryption of plain text blocks and for the decryption of ciphertext blocks.

The prior art system of Kurdziel, et al. U.S. Pat. No. 6,108,421, which is commonly owned and has inventors in common with the present application, is directed to a scaleable block cipher device which is customizable and not vulnerable to standard cryptoanalysis techniques.

It is known to use multiple encryption to provide robust and enhanced security of the encrypted data. However, such multiple encryption schemes have disadvantages. Multiple encryption schemes require multiple iterations through a cryptographic system. In the case of duplicate hardware blocks, this doubles or triples the gate count and power consumption in hardware renderings. In cases where execution of a single block is repeated, the maximum speed that the cryptographic system can operate at will be reduced to one-half or one-third depending on the number of iterations required.

Additionally, multiple encryption schemes require that a cipher method not be a mathematical function known as a "group". If a cipher method is a group, no security enhancement is obtained by using it in a multiple encryption scheme. The significance of this is that it is often impossible to conclusively prove a cryptographic system is not a group. Indeed, a cryptographic system that approximates the behavior of a group, to even a slight degree will suffer security vulnerabilities when used in a multiple encryption scheme.

Thus, there is a need for block cipher device which is scaleable and customizable and providing the all the enhanced cryptographic strengths of a multiple encryption scheme, but without the severe disadvantages associated with multiple encryption.

Accordingly, it is an object of the present invention to provide a novel scaleable block cipher device that is secure against available cryptanalysis or cracking techniques.

It is another object of the present invention to provide a novel block cipher device which provides enhanced security while maintaining compatibility with the prior art cipher devices.

It is still another object of the present invention to provide a novel block cipher device having double the cryptographic strength without a proportional increase in gate count of hardware renderings.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
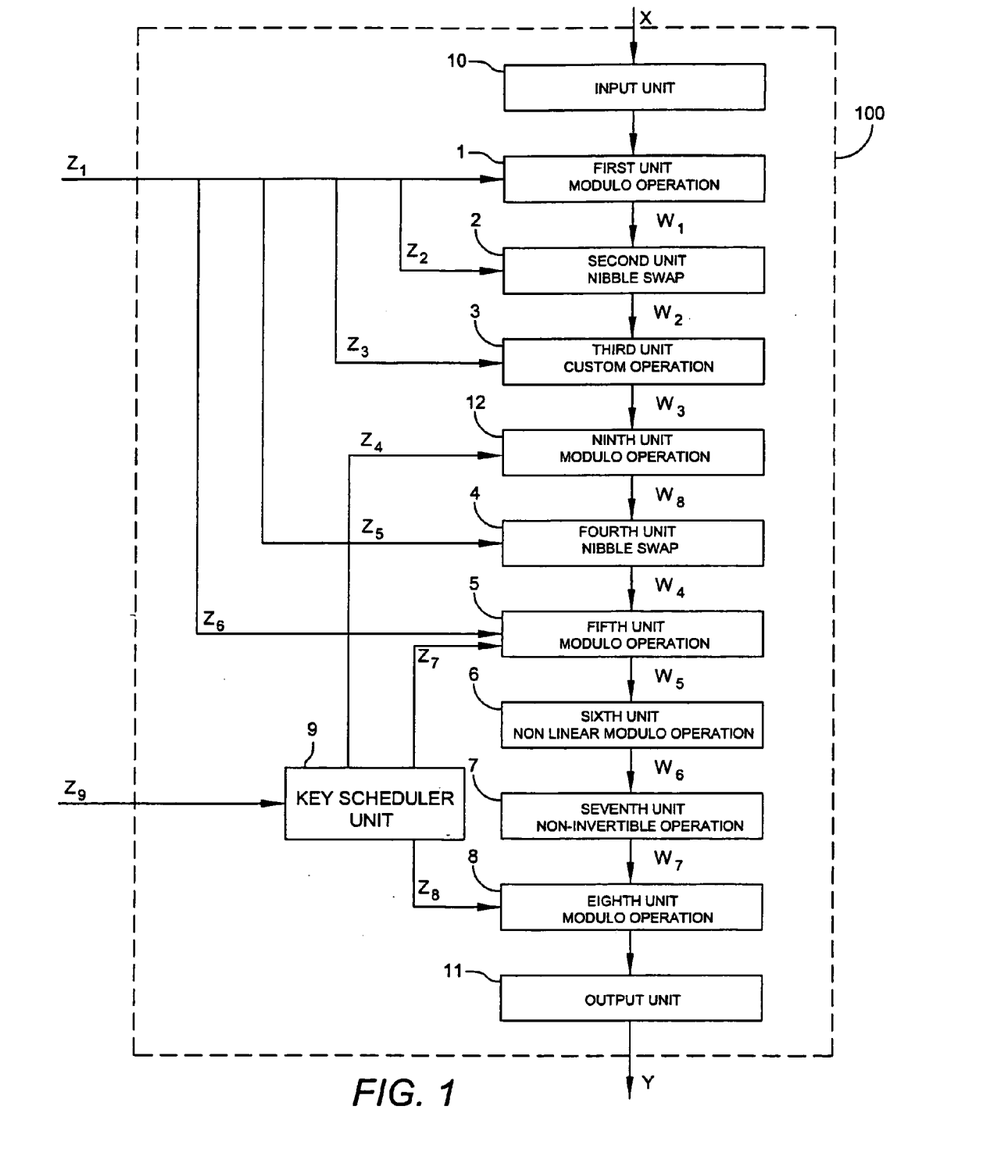
FIG. 1 is a high level block diagram of a block cipher device of the present invention.

With reference to FIG. 1, a block cipher device 100 is non-recursive and may include an input unit (not shown), nine encryption stages 1–8 and 12, an output unit (not shown), and a key scheduling unit 9.

The input unit and output unit assemble and buffer input and output data to and from the block cipher device 100. The structure of the input unit and output unit generally depends on an application (e.g., serial or parallel). The input unit and output unit are not unique to the block cipher device 100.

The block cipher device receives three input variables, X, $Z_1$, and $Z_9$ and produces an output variable, Y. X is the primary traffic input to the block cipher device 100 and Y is the primary traffic output. $Z_1$ and $Z_9$ may be externally applied variables. $Z_9$ may be a secret "Key" variable which is input to the block cipher device 100 via a secure channel (e.g., a courier with sealed cover) prior to encryption or decryption. $Z_1$ (or "customer algorithm modification" variable) and subunits of $Z_1$ (i.e., $Z_2$, $Z_3$, $Z_5$ and $Z_6$) are operated on in the first, second, third, fourth and fifth units 1, 2, 3, 4 and 5 of the block cipher device 100. The output Y of the block cipher device 100 is a unique function of the primary traffic X, the Key variable $Z_9$ and the variable $Z_1$.

With continued reference to FIG. 1, each encryption stage has at least a 64-bit I/O space. Encryption stages 1, 5, 6 and 8 consist of modular arithmetic logic. Stages 1, 5 and 8 perform modular additions and stage 6 performs a modular cubing operation. Each stage employs a different modulus. Stage 7 is a non-invertable "Mid Transform". In addition, stages 1, 5, 6, 7 and 8 can not be segmented into a set of lower level operations. These design features make the Block Cipher Device secure against popular "Cryptanalysis" or cracking techniques.

Stages 2 and 4 are "nibble swapping" blocks. These blocks allow the structure of the algorithm to be changed based on an externally applied input, $Z_1$. Stage 3 is a customizable Substitution/Expansion block. This allows a custom operation with inputs $W_2$ and $Z_3$ and output $W_3$ to be inserted into the Block Cipher Device structure. This allows unique algorithm variants to be implemented. The structure of block 3 is not arbitrary and must meet the requirements of secure cipher design. Custom Substitution/Expansion block designs are disclosed only to the intended end user.

An input unit 10 assembles and buffers input data to the block cipher device 100 and the output unit 11 assembles and buffers output data from the block cipher device 100.

Encryption stage 12, like stages 1, 5 and 8, performs a modular addition operation. Key scheduling unit 9 accepts an externally applied input variable, $Z_9$, and deterministically generates three pseudo random bit patterns, $Z_4$, $Z_7$, and $Z_8$. These patterns are used as operands for blocks 12, 5 and 8 respectively.

To facilitate the description, FIGS. 2, 3, 4 and 5 illustrate 64 bit block implementations. 64 bit blocks are used only as an example. Generally, in 64 bit block implementations, each unit includes at least a 64 bit input/output space. A block cipher device of the present invention having any input or output size can be designed by appropriately scaling the size of block cipher device operations.

Figure 2:
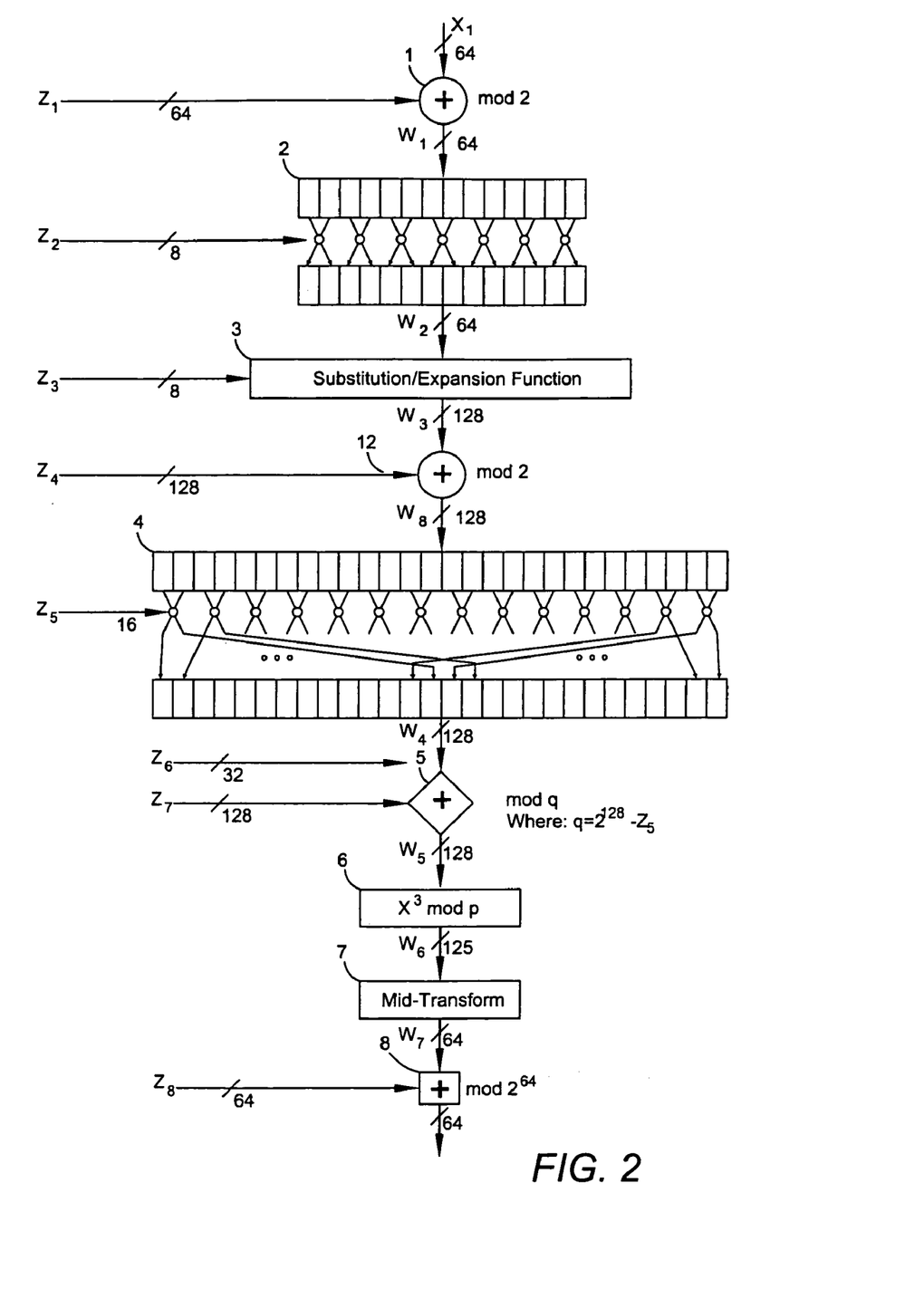
FIG. 2 is a schematic diagram of the block cipher device shown in FIG. 1.

With reference to FIG. 2, the first unit 1 performs a modulo 2 addition (Exclusive-Or) on primary traffic input X with variable $Z_1$ resulting in first unit 1 output $W_1$.

The second unit 2 performs a nibble swap operation. The second unit 2 segments $W_1$ into 8 pairs of nibbles; each nibble holding 4 bits. The second unit 2 transposes each segment based on $Z_2$ (e.g., bits 0–7 of $Z_1$) resulting in second unit 2 output $W_2$. For example, when the value of bit "0" in $Z_2$ is equal to binary "1" then the order of the nibbles pair "0" will be transposed. Likewise, if bit "0" in $Z_2$ is equal to binary "0" then the order is left unchanged. The order of each nibble pair will be determined by the value of the corresponding bit in $Z_2$. The value of bit 0 controls the order of nibble pair 0, the value of bit 1 the order of nibble pair 1 continuing through to bit 7 which controls the order of nibble pair 7.

The third unit 3 is a custom unit providing a custom substitution and expansion operation. The custom operation with inputs $W_2$ and $Z_3$ and output $W_3$ may be inserted into the block cipher device 100 in the form of a look-up table. $Z_3$ may be bits 24 through 31 of $Z_1$. Providing a custom unit allows unique system variants to be designed and provided while meeting the requirements of secure cipher design. For example, the customized substitution or expansion operation of a look-up table is only disclosed to intended end users.

The fourth unit 4 may be another nibble swap operation where $W_8$ is segmented into 16 nibbles. $Z_5$ (for example, bits 24 through 31 of $Z_1$) controls the re-ordering of $W_8$ in a slightly different manner than explained for the second unit 2. For example, when the value of bit "8" in $Z_5$ is equal to a binary "0" then the first nibble in the pair will be written to the first position in the high order segment of $W_4$ and the second nibble will be written to the first position in the low order segment of $W_4$. When the value of bit "8" in $Z_5$ is equal to a binary "1" then the two nibbles will be transposed before being written to $W_4$. As with the second unit 2, the re-ordering of each nibble pair will be determined by a corresponding bit in $Z_5$.

The fifth unit 5 performs a modulo addition operation. $W_4$ and $Z_7$ are operands of the fifth unit 5. $W_4$ is the output of the fourth unit 4 and $Z_7$ is an output from the key scheduler unit 9. The modulus q of the operation is determined using $Z_6$ by the following relation:

$$q = 2^{128} - Z_6 \quad (1)$$

$Z_6$ may be bits 33 through 64 of $Z_1$.

The sixth unit 6 performs a modular cubing operation. In other words, $W_5$ is raised to the third power modulo p and the result is designated as $W_6$. The modulus p is determined by the following relation:

$$p = 2^{125} - X \quad (2)$$

The variable X is chosen such that the greatest common denominator between the order of the operation "3" and (p−1) is equal to 1. This is captures in the following equation:

$$GCD(3, p-1) = 1 \quad (3)$$

The seventh unit 7 performs a non-invertible operation such as an operation known as a mid transform. The input to the operation, $W_6$, is 128 bits in length and the output of the operation, $W_7$, is 64 bits in length. The mid transform simply maps bits 64 bits of the input to a 64 bit output. For example, the mid transform may map bits 30 through 93 of $W_6$ to bits 0 through 63 of $W_7$. The rest of the bits in $W_6$ are discarded.

The eighth unit 8 performs another modulo addition operation. $W_7$ and $Z_8$ are operands of this unit. $W_7$ is an output from the seventh unit 7 and $Z_8$ is an output from the Key Scheduler 9. The modulus of the operation is chosen as $2^{64}$. The output of this stage is the output of the block cipher device and is designated as $Y_1$.

Although specific values are specified for moduli of the first, fifth, sixth, and eighth units 1, 5, 6, and 8, the objective of the block cipher device will be satisfied by a range of choices. It is required, however, that the constraint of equ. 3 be satisfied and that a unique modulus be used in each stage. The "modulo" units 1, 5, 6, and 8 along with "non-invertible" unit 7 are not segmentable into a set of lower level operations.

Figure 3:
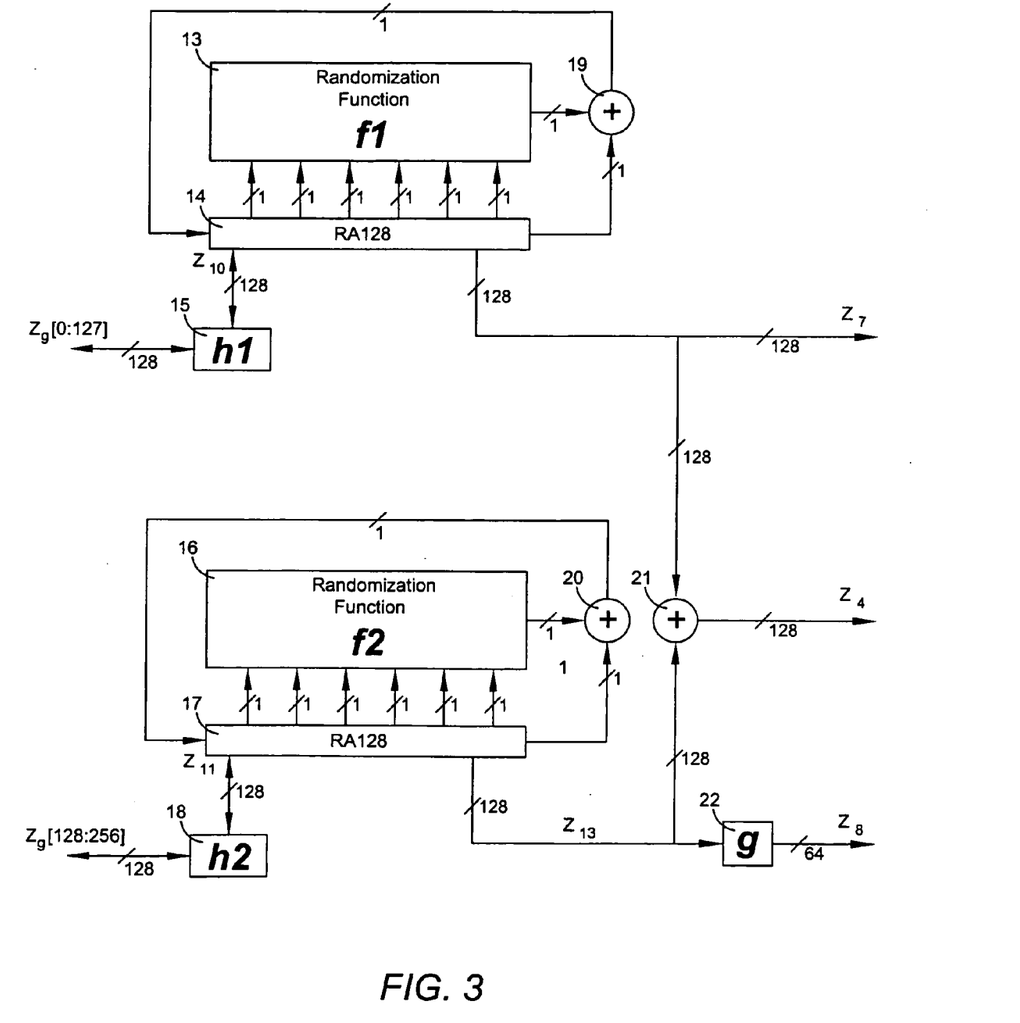
FIG. 3 is a schematic diagram of a key scheduling unit for use with the block cipher shown in FIG. 2.

With reference to FIG. 3, The key scheduler unit 9 comprises a first function unit 13, a second function unit 16, a third function unit 15, a fourth function unit 18, a fifth function unit 22, a first shift register 14, a second shift register 17, a first mod 2 add logic gate 19, a second mod 2 add logic gate 20, and a third mod 2 add logic gate.

The key scheduling unit 9 processes key variable $Z_9$ to produce variables $Z_4$, $Z_7$, and $Z_8$. These variables are used during encryption and decryption. $Z_{10}$ and $Z_{11}$, are deterministic functions, h, of the higher and lower halves of key variable $Z_9$. $Z_{10}$ and $Z_{11}$ are the outputs of the third function unit 15 and fourth function unit 18, respectively, and are input to shift register 14 and shift register 17, respectively. Each of these registers is shifted to the right one bit at a time until its contents have been completely recirculated. With each shift, the least significant bit in each register is mod 2 added to the output of its associated function unit, the first function unit 13 or the second function unit 16. The result is moved into the most significant bit position of each register. When the contents of the first shift register 14 and the second shift register 17 have been completely processed, it is output as variables $Z_7$ and $Z_{13}$, respectively. $Z_7$ becomes one of three pseudo random outputs of the key scheduling unit 9. $Z_{13}$ is modulo 2 added to $Z_7$ to produce pseudo random output $Z_4$. In addition, $Z_{13}$ is input to fifth function unit 22 to produce variable pseudo random output $Z_8$.

The first function unit 13 and the second function unit 16 are custom lookup tables. They map at least 6 one bit inputs to a single one bit output. Each of the inputs to the first function unit 13 and the second function unit 16 is a "tap" connected to an individual bit position in the first shift register 14 and the second shift register 17, respectively. The tap locations can be arbitrarily chosen with the following constraint. No tap can be connected to either the least significant or to the most significant bit positions on shift register 14 and shift register 17. The structure of the first function unit 13 and the second function unit 16 are not arbitrary and must meet the requirements of secure cipher design. Note that the first function unit 13 and the second function unit 16 can be independently specified. However, as described below, the first function unit 13 must be set equal to the second function if the block cipher 100 is to operate in a mode compatible with the prior art block cipher described in U.S. Pat. No. 6,108,421. The first function unit 13 and the second function unit 16 may be customized and disclosed only to the intended end user.

The fifth function unit 22 performs a bit-wise mod 2 add without carry of the higher and lower order halves of $Z_{13}$ to produce $Z_8$.

The third function unit 15 and the fourth function unit 18 perform a bit-wise mod 2 add without carry of each of each half of key variable $Z_9$ and a custom bit pattern of equal length, producing variables $Z_{10}$ and $Z_{11}$. Note that a third function unit 15 and the fourth function unit 18 can be independently specified. However, as described below the third function unit 15 must be set equal to the fourth function unit 18, if the block cipher 100 is to operate in a mode compatible with the prior art block cipher described in U.S. Pat. No. 6,108,421. The value of the custom bit pattern is disclosed only to the intended end user.

With reference to FIG. 2, the ninth unit 12 is a modulo addition stage. It adds the output $W_3$ of the third unit to $Z_4$ from the key scheduling unit 9 to produce output $W_8$. Outputs $Z_7$ and $Z_8$ are used as inputs to the fifth unit 5 and the eighth unit 8, respectively.

A significant feature of the key scheduling unit 9 is that it uses a key variable, $Z_9$, which is twice the length of the key variable of the prior art system of U.S. Pat. No. 6,108,421 and therefore offers significantly increased cryptographic strength. In addition, when a symmetric key variable (i.e. upper half and lower half are equal) is input, then $Z_4$ will evaluate to zero. This negates any effect of encryption block 12. In fact, when a symmetric key variable is input, all operations will evaluate such that the block cipher device 9 will produce the same output for a given input as the prior art block cipher of U.S. Pat. No. 6,108,421. Significant, equipment can be designed to use the present embodiment of block cipher 100 with double the key length having significantly increased cryptographic strength while still providing a mode for inter-operating with equipment using prior art block ciphers.

When required, the value of the original key variable $Z_9$ can be recovered. Variables $Z_7$ and $Z_{13}$ are reloaded into the first shift register 14 and the second shift register 17, respectively. Each register is shifted to the left one bit at a time until its contents have been completely re-circulated. With each shift, the most significant bit in each register is mod 2 added to the outputs of the first function unit 13 and the second function unit 16. The result is moved into the least significant bit position. When the contents of the first shift register 14 and the second shift register 17 have been completely processed, each is input to the third function unit 15 and the fourth function unit 18, respectively. In the third function unit 15 and the fourth function unit 18, the same custom bit pattern is bit-wise mod 2 added to reproduce the upper and lower halves of $Z_9$.

This permits an original encryption key to be recovered for other cryptographic operations, for example key wrapping (key encryption). Alternately, a copy of the original key may be kept in an auxiliary register. However, this would require a 256 bit auxiliary storage register which would add to the gate count of a hardware rendering.

The block cipher device may be operated in various modes such as a self-synchronizing cipher feedback mode (SSCFB), a minimum error propagation (or counter) mode (MEP), or a block cipher feedback mode (BCFB).

Figure 4:
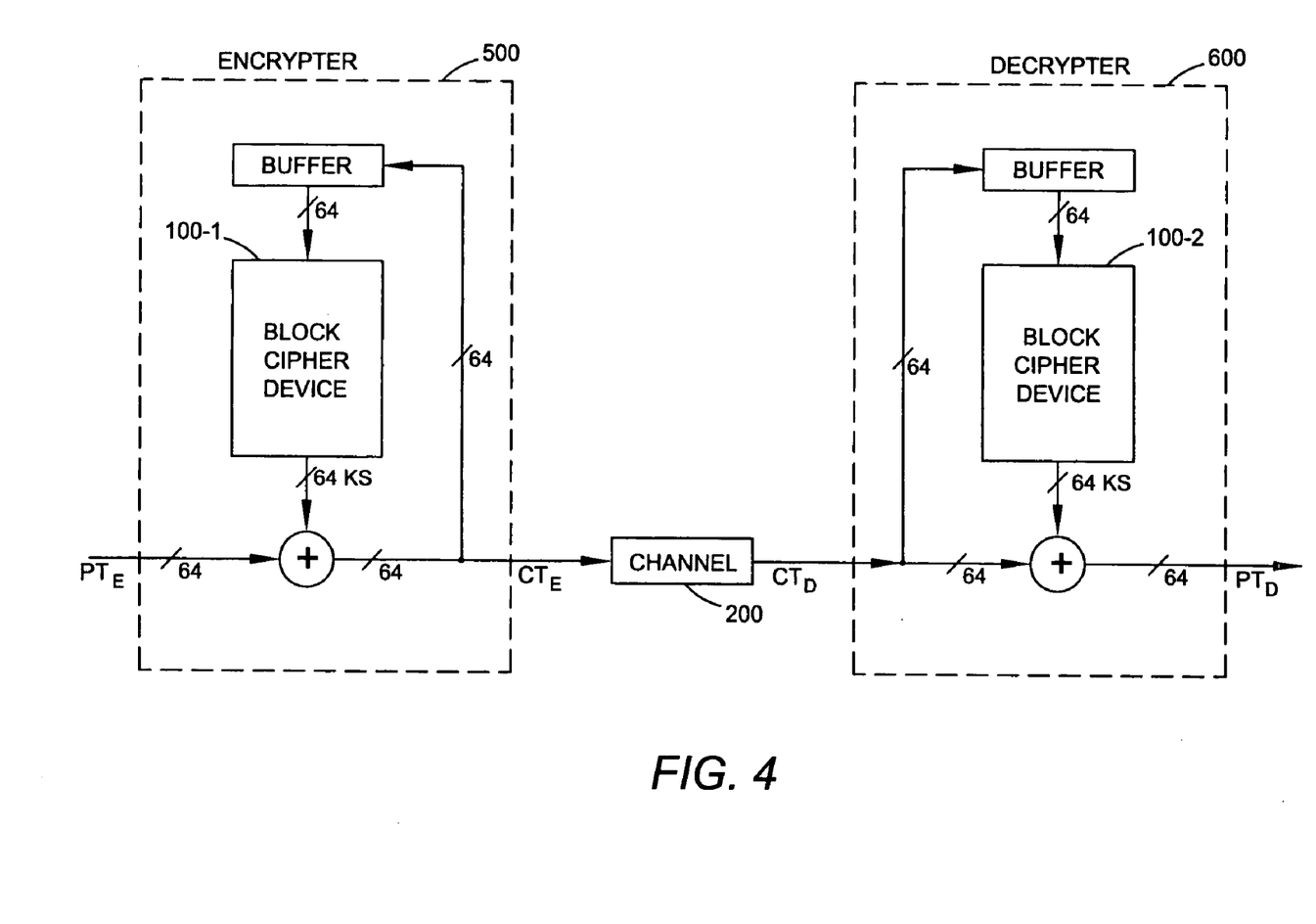
FIG. 4 illustrates a communication system using an embodiment of the present invention in Block Cipher Feedback Mode (BCFM).

With reference now to FIG. 4 illustrating a BCFB mode, a block of unencrypted data or "Plain Text" (PT) is applied to the input of the encrypter 500 labeled $PT_E$. $PT_E$ is then modulo 2 added to a block of "Key Stream" KS. KS represents the output of the block cipher device 100-1. CT represents the resulting block (i.e., cipher text). CT is output at the port labeled $CT_E$ and is then transmitted over a channel 200. In the next iteration, CT is fed back as input to the block cipher device 100-1. The block cipher device processes the fed back block to produce a new block of KS. KS is then combined with the next block of PT and the encryption process continues. At the decrypter 600, received CT is represented by $CT_D$. $CT_D$ is combined with a block of KS to produce as output a block of recovered plain text $PT_D$. The $CT_D$ block is simultaneously applied to the input of the block cipher device 100-2. The block cipher device 100-2 uses the $CT_D$ block as input to produce another block of KS. This KS block is used to process the next block of $CT_D$. This mode is intended for relatively error free communication channels.

Figure 5:
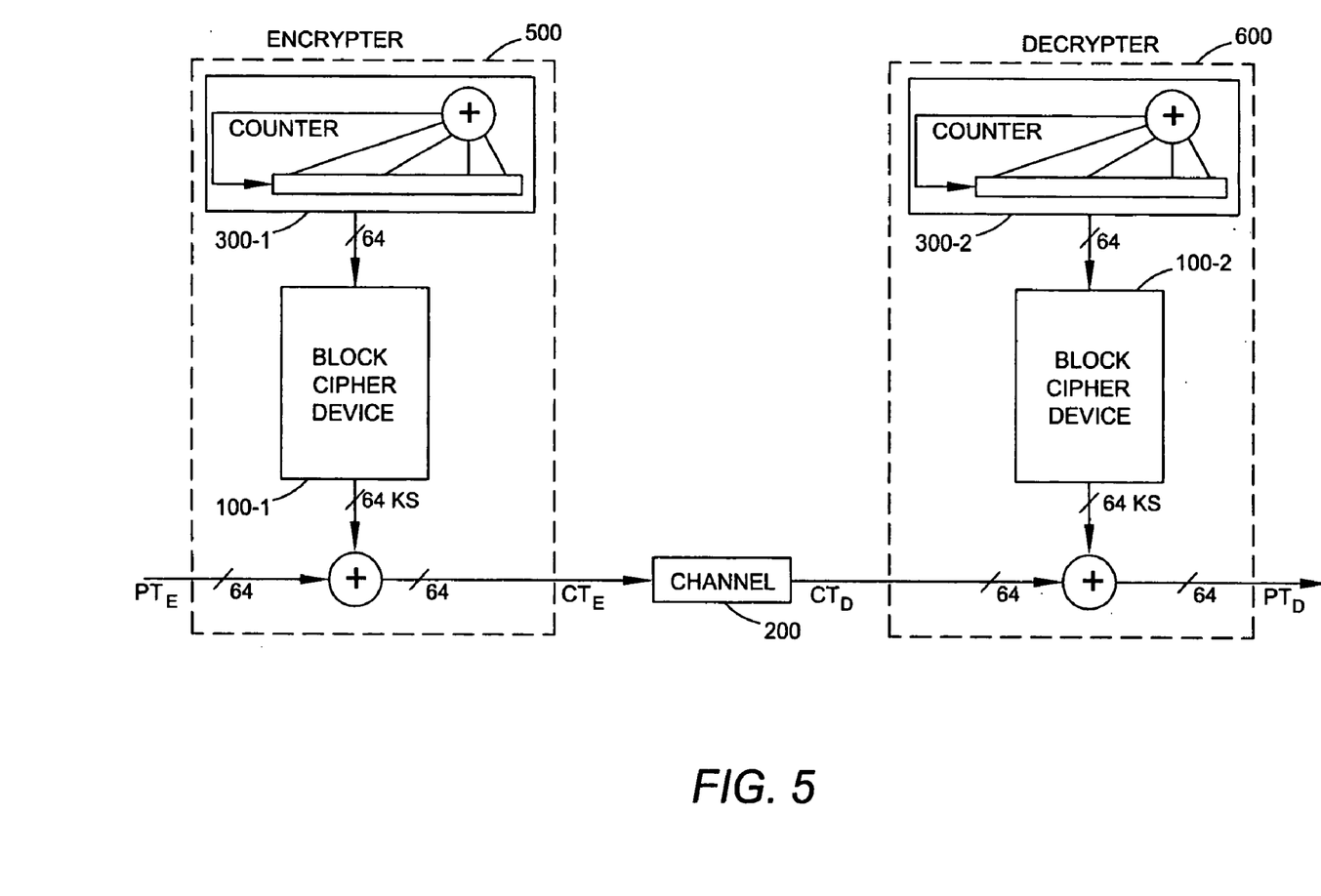
FIG. 5 illustrates a communication system using an embodiment of the present invention in Minimum Error Propagation Mode (MEP).

With reference now to FIG. 5 illustrating a MEP mode, unencrypted data or "Plain Text" PT is applied to the input of the encrypter 500 labeled $PT_E$. $PT_E$ is then modulo 2 added to a block of KS to produce a block of cipher text. CT is output at a port labeled $CT_E$ and is then transmitted over the channel 200. For a next iteration, encrypter counter 300-1 is incremented and the output of the counter 300-1 is input to the block cipher device 100-1. The block cipher device 100-1 processes to produce a new block of KS. The new block of KS is then combined with the next block of PT and the encryption process continues. At the decrypter 600, received CT is represented by $CT_D$. $CT_D$ is combined with a block of KS to produce as output a block of recovered plain text $PT_D$ and decrypter counter 300-2 is incremented. The block cipher device 100-2 uses the output of the counter to produce another block of KS. This KS block is used to process the next block of $CT_D$. This mode is intended for noisy or error prone communication channels. A toggled bit error on the channel will likely result in only a one bit error on $PT_D$. In other words, in this mode the cryptographic system will likely have only one bit of error extension.

Figure 6:
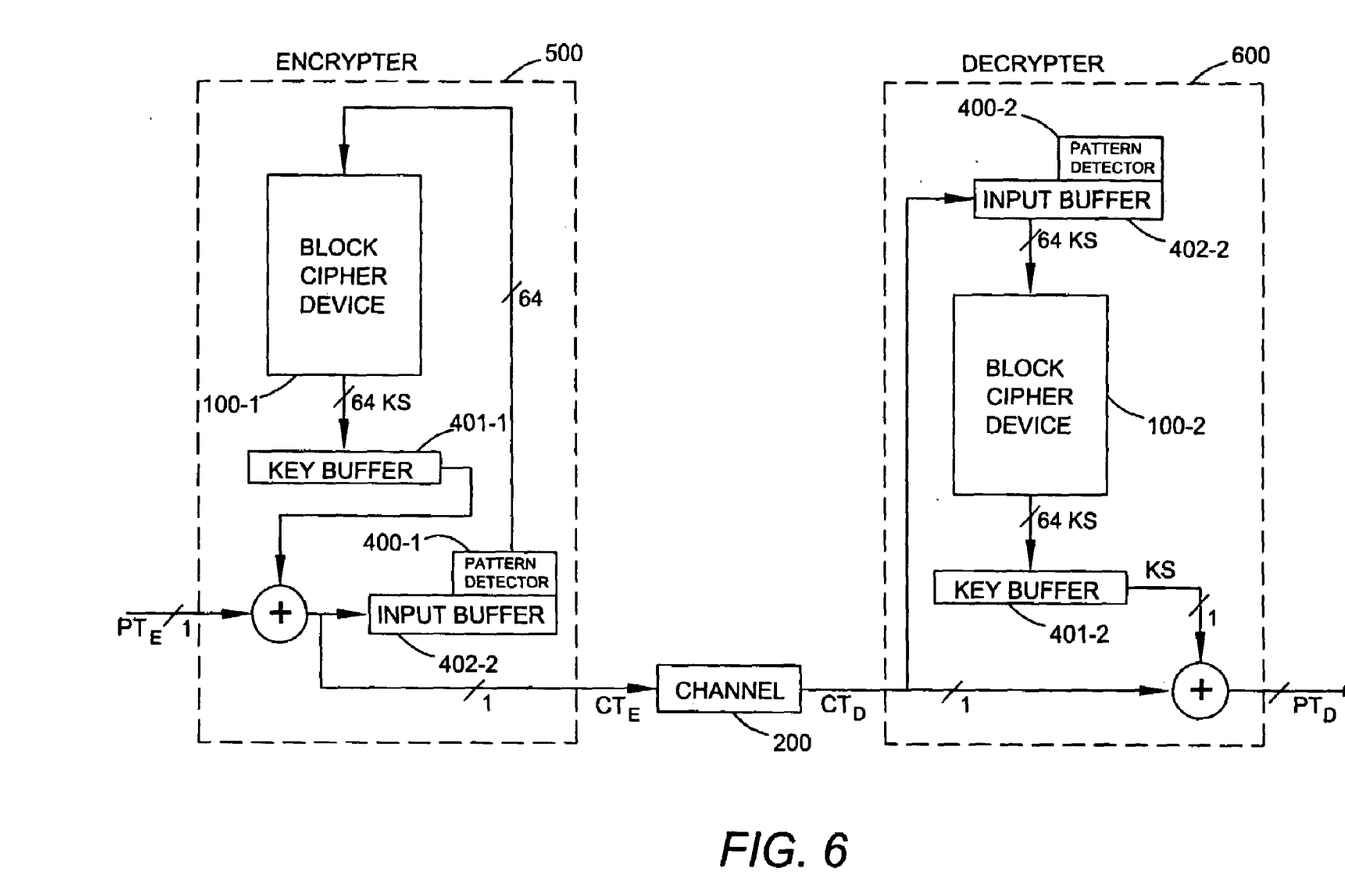
FIG. 6 illustrates a communication system using an embodiment of the present invention in Self-synchronizing Cipher Feedback Mode (SSCFB).

With reference now to FIG. 6 illustrating a SSCFB mode, unencrypted data or "Plain Text" (PT) is applied one bit at time to the input labeled $PT_E$. Each $PT_E$ bit is modulo 2 added to a bit of KS to produce a bit of cipher text CT. Encryption continues until another iteration is initiated. Another iteration may begin when either the entire block of KS is consumed or when the pattern detector 400-1 is triggered. The pattern detector 400-1 continually monitors CT for a specific bit sequence and when the sequence is detected a new iteration is triggered. Because CT appears statistically random, this mechanism will initiate a new iteration at pseudo-random intervals. When a new iteration is initiated, all remaining KS is purged from the key buffer 401-1 and the most recent bit block of CT, $CT_E$, is input to the block cipher device 100-1. The block cipher device 100-1 uses the most recent block as input to produce another block of KS. The new block of KS is stored in the key buffer 401-1 and is used to continue the encryption process. At the decrypter 600, the received CT is applied one bit at time to input labeled $CT_D$. Each $CT_D$ bit is modulo 2 added with a bit of KS to produce a bit of recovered "Plain Text" as output $PT_D$. The CT bit stream is simultaneously applied to the input buffer 402-2 (CB1) of the block cipher device 100-2. When either the input buffer 402-2 becomes full or the pattern detector 400-1 triggers, the following will occur:

1) the key buffer 401-2 is purged;

2) the most recent block of CT, $CT_E$, is input to the block cipher device 100-2;
3) the block cipher device uses the most recent block of CT to produce a new block of KS; and
4) the new block of KS is stored in the key buffer 401-2.

The block cipher device 100-2 continues processing and $CT_D$ continues to be shifted into input buffer 402-2 until another iteration is initiated. This mode is intended for communication channels that are subject to synchronization errors. In this mode, a communication system will be able to automatically recover from loss cryptographic and block boundary synchronization.

To operate in any of the modes shown in FIGS. 3–63, the encrypter 500 and the decrypter 600 must first be initialized such that their internal states are all identical. Initialization may be obtained using an initialization vector "IV" which is generated on the encrypter side and is used to initialize all internal states of the encrypter. The IV is then transmitted over the channel 200 to the decrypter 600. Using the IV, all internal states of the decrypter 600 are initialized to the same values.

ADVANTAGES AND SCOPE OF THE INVENTION

The method of the present invention offers the many advantages including twice the cryptographic strength without a proportional increase in the gate count of hardware renderings. This is extremely significant in that operational parameters, such as heat dissipation and power consumption increase proportionally with gate count. Other parameters such as data rate and production yield will generally be inversely proportional to gate count.

The method is also more robust cryptographically. It does not suffer from the strength vulnerabilities associated with other approaches, most notably, multiple encryption schemes.

Moreover, the method of the present invention provides the above mentioned and other advantages while maintaining backward interoperability with less robust systems of the prior art such as disclosed in U.S. Pat. No. 6,108,421, referenced above.

While preferred embodiments of the present invention have been described in the foregoing, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a cryptographically secured digital communication system, a method of selectively adapting a plurality of block cipher devices having at least a first block cipher device that is computationally a function of a first fixed length selectively variable key to encrypt and decrypt a digital signal for operation with a second block cipher device that is computationally a function of a second fixed length selectively variable key one half the length of the first key to encrypt and decrypt the digital signal the method comprising the steps of:
   (a) providing a first key generator having two equal sections of symbols, each section a functional replica of a second key generator;
   (b) replicating the second key in both of sections of the first key;
   (c) using the symbols provided by one of the two sections to encode and decode the signal in a first stage; and
   (d) combining the symbols provided by the two sections of the first key generator to cancel the symbols applied to a second stage.

* * * * *